United States Patent Office 2,726,259
Patented Dec. 6, 1955

2,726,259

PROCAINE β-ETHOXYPROPIONATE

Robert Simonoff, Lynnewood Gardens, Pa., assignor to William H. Rorer, Inc., Philadelphia, Pa., a corporation of Pennsylvania No Drawing. Application July 1, 1952,
Serial No. 296,766

1 Claim. (Cl. 260—472)

This invention relates to anesthetics.

It has heretofore been proposed to employ procaine hydrochloride as an anesthetic for nerve block, spinal anesthesia and for infiltration, and a dilute solution is injected to produce anesthesia at the desired location. The procaine hydrochloride is not suitable for topical application.

It has also heretofore been proposed to employ procaine butyrate as an anesthetic, this being suitable for injection or for topical application. The procaine butyrate has a somewhat offensive odor.

I have ascertained, as a result of experiments, that by the use of β-ethoxy propionate and other members of the same series with procaine base, an anesthetic can be prepared which is suitable for topical application, or for injection as desired, which is free from habit forming characteristics, which has a shorter induction period, which has a longer duration or period of effective action, which is free from offensive or objectionable odor, and which may be incorporated in any desired vehicle for application.

One suitable material in accordance with the invention is procaine β-ethoxy propionate, having the formula:

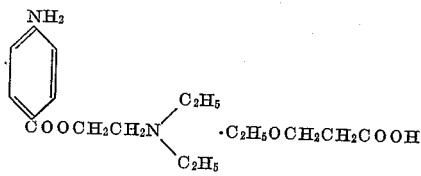

A preferred mode of preparation is as follows:

To one mole of redistilled β-ethoxy propionic acid is added one mole of anhydrous procaine base. The mixture is warmed on a water bath at about 60° to 70° C. for a period of from about 30 to 45 minutes, with constant agitation. The resultant material is then crystallized, preferably by cooling in a refrigerator. The crude product is then washed with cold hexane or cyclohexane and dried in a vacuum dessicator over sulfuric acid.

The crystalline salt thus obtained may be dissolved in water or other desired solvent and may be incorporated in any desired vehicle in accordance with the intended mode of application and in a concentration ranging from about ½% to 50% by weight of the vehicle.

Comparative tests by application to rabbit corneas, the standard test for local or topical application indicates, for a 2% solution of the anesthetic, a much shorter induction time, of the order of 45 seconds to one minute as compared to about two minutes for procaine butyrate, and a longer duration, of approximately twenty-four minutes as compared to about ten to twelve minutes for procaine butyrate.

Another suitable anesthetic material is procaine β-methoxy propionate, having the formula:

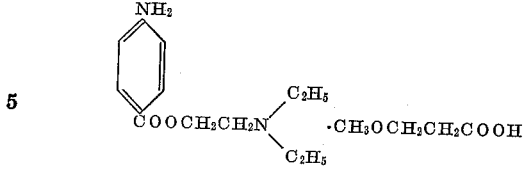

This is prepared in the same manner as the procaine β-ethoxy propionate but with β-methoxy propionic acid as the starting point for combination with the procaine base.

Another suitable anesthetic is procaine β-propoxy propionate having the formula:

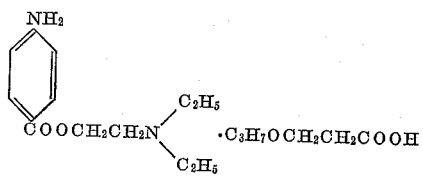

This is prepared in the same manner as the procaine β-ethoxy propionate but with β-propoxy propionic acid as the starting point for combination with the procaine base.

Another suitable anesthetic material is procaine β-isopropoxy propionate, having the formula:

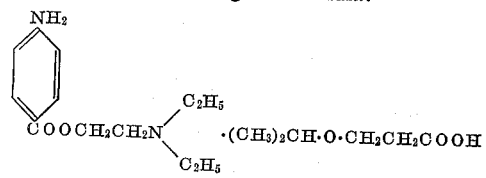

This is also prepared in the same manner as the procaine β-ethoxy propionate except that β-isopropoxy propionic acid is utilized for combination with the procaine base.

Another suitable anesthetic material is procaine β-butoxy propionate, having the formula:

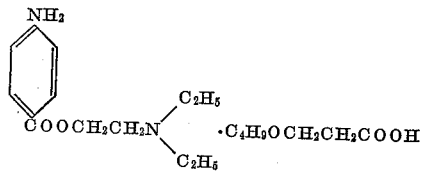

This is also prepared in the same manner as the procaine β-ethoxy propionate except that β-butoxy propionic acid is employed as the starting point with the procaine base.

Another suitable anesthetic material is procaine β-isobutoxy propionate, having the formula:

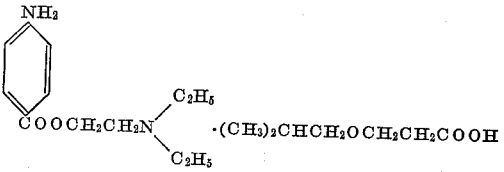

This is also prepared in the same manner as the procaine β-ethoxy propionate except that β-isobutoxy propionate acid is employed for reaction with the procaine base.

I claim:

As an anesthetic procaine β-ethoxy propionate.

References Cited in the file of this patent

UNITED STATES PATENTS 2,175,782     Rorer _____ Oct. 10, 1939